United States Patent [19]

Lailly

[11] Patent Number: 4,972,383
[45] Date of Patent: Nov. 20, 1990

[54] METHOD OF OBTAINING A MODEL REPRESENTATIVE OF A HETEROGENEOUS MEDIUM, AND PARTICULARLY THE SUB-SOIL

[75] Inventor: Patrick Lailly, Le Vesinet, France

[73] Assignee: Institut Francais du Petrole, Ruiel Malmaison, France

[21] Appl. No.: 390,371

[22] Filed: Aug. 7, 1989

[30] Foreign Application Priority Data

Aug. 5, 1988 [FR] France .................. 88 10719

[51] Int. Cl.$^5$ .............................................. G01V 1/30
[52] U.S. Cl. ........................................ 367/73; 367/38
[58] Field of Search .................... 367/38, 73; 364/421

[56] References Cited

U.S. PATENT DOCUMENTS 4,679,174  7/1987  Gelfand ................................. 367/73
4,817,062  3/1989  De Buyl et al. ....................... 367/73

OTHER PUBLICATIONS

Oldenburg, D. A. et al., "Inversion of Band Limited Reflection Seismograms: Theory and Practice," Proc. IEEE, vol. 74, #3, Mar. '86.

Bamberger, A. et al., "Inversion of Normal Incidence Seismograms," Geophysics, vol. 47, #5, May '82.

Lavergue, M. et al., "Inversion of Seismograms and Pseudo Velocity Logs," Geophysical Prospecting, vol. 25, 1977.

Western Geophysical Brochure, SLIM, 1983.

*Primary Examiner*—Ian J. Lobo
*Attorney, Agent, or Firm*—Antonelli, Terry, Stout & Kraus

[57] ABSTRACT

A method for providing an optimum model having at least two dimensions of a heterogeneous medium, representing the variations of at least one physical parameter, for example the acoustic impedance of underground formations, and satisfying as well as possible the data measured in situ, for example well-logging in wells in studying the sub-soil as well as other data relative to the medium studied, for example geological information and seismic surface recordings. The method includes the construction of a reference model and the definition of covariance operators which model the uncertainties not only in the medium studied but also in the recordings obtained from outside the medium, for example seismic sections. Comparison between the effective recordings and others which are formed on the basis of the constructed model, makes it possible to check the validity thereof. The resolution method chosen results in coupling together different information used and separating the coherent parts (the signals) from the incoherent parts (the noise).

8 Claims, 6 Drawing Sheets

METHOD OF OBTAINING A MODEL REPRESENTATIVE OF A HETEROGENEOUS MEDIUM, AND PARTICULARLY THE SUB-SOIL

BACKGROUND OF THE INVENTION

1. Field of the Invention

The invention relates to a method for obtaining a model representative of a heterogeneous medium from indirect measurements obtained from outside the medium and other data, particularly a set of pinpoint data measured in situ.

The method of the invention may be suitable in very different fields depending on the type of transmission used for obtaining the images. It applies particularly in the geophysical field, and in particular for the processing of seismic data. For the needs of seismic prospecting by reflection, waves are transmitted from a seismic source. They propagate in the ground to be explored, and the reflections of these waves from the discontinuities of the sub-soil are picked up by a set of seismic sensors spaced apart along the sub-soil section to be studied. The signals recorded as a function of time are generally sampled in digitized form. By regular movement of the seismic source and the set of sensors and repetition of the transmission-reception cycles, a large number of seismic traces are recorded containing information about the sub-soil.

2. Description of the Prior Art

Different ways of processing the recordings by programmed digital computers have been systematically utilized to improve their readability. It is a question in particular of stacking recording traces by applying the so-called multiple coverage method to improve the signal-to-noise ratio, or the deconvolution and migration method, as is well known by specialists, to improve the vertical resolution and the horizontal resolution.

In particular, preserved amplitude processing makes it possible to eliminate all the phenomena which are not related to the reflectivity of the discontinuities under normal incidence. Thus, the processing section is representative of the geological interfaces, the amplitudes of the reflected waves then being substantially proportional to the reflection coefficients corresponding to the discontinuities of the sub-soil. After preserved amplitude processing, the seismic image therefore contains lithologic information.

The improved seismic sections which are obtained after such processing are then available for interpretation. It is a question of transforming each seismic section in time into a lithologic image of the sub-soil and, therefore, to estimate with sufficient accuracy the value of the acoustic impedance of the different layers of the sub-soil, namely the product of their density by the speed of propagation of the waves which propagate therein, whose discontinuities are responsible for the reflections.

The passage to a lithologic representation of the sub-soil better representing the seismic sections obtained is generally very delicate to solve. A conventional method, by a so-called mono-channel deconvolution and by forming pseudo acoustic impedance logs, makes it possible to obtain such inversion. It consists essentially, with the seismic excitation to the ground being previously estimated, in reconstituting from real seismograms the real distribution of the values of the acoustic impedance as a function of the depth measured during the propagation time. Such a method is described for example in an article entitled "Inversion of Seismograms and pseudo-velocity logs" in Geophysical Prospecting, vol 25, pp 231-250, 1977.

The validity of the results is checked against other data which is available from elsewhere. In general, information is available concerning the position of the interfaces and certain characteristics of the sub-soil, whether they result from prior interpretations or have been obtained otherwise by making well measurements (well logging, PSV, etc . . . ) in one or more boreholes passing through the part of the sub-soil studied, with different tools.

The results obtained by this type of method are not always satisfactory. They often reveal themselves irreconcilable with the results of well-logging measurements. The divergence of the results is generally attributed to the uncertainties of the exact form of the excitation transmitted to the sub-soil, to the considerable background noise disturbing the useful seismic signals and also to their relatively narrow frequency band. In addition, the solutions which can be found to the inversion problem are unstable. Very different impedance distributions may just as well explain the same seismic section. The task of the interpreter who must derive a geological model from the distribution of the impedance values obtained by these inversions, by reconciling it with the different data known from elsewhere, is therefore delicate. It is also found in practice that the lithologic model obtained may be questioned.

A known approach for overcoming the inaccuracies of a model, consists in improving it by successive steps. From an initial model chosen a priori from data resulting from interpretations and well-logging, and at this stage still largely hypothetical, synthetic seismograms are calculated of the model, and they are compared with actual seismograms. Since the differences noted represent the imperfection of the model, the latter is modified. This cycle of constructing synthetic seismograms and comparison is repeated, and the variations applied to the basic model are progressively selected which lead to a reduction of the differences so as to approximate as much as possible the actual seismograms obtained.

It is also known to automate the above process by searching for the acoustic impedance distributions, such that the synthetic seismograms are adjusted as well as possible to the seismic recordings. Such approaches using a mono-channel are described, for example, by Bamberger et al. in Geophysics vol 47, pp 757-770, May 1982, or by Oldenberg et al., in Proceedings of the IEEE, special issue on Seismic Inversion, Mar. 1986.

Obtaining an impedance section which is compatible with the geological information makes it necessary to impose a lateral correlation on the results and so to find solutions suitable in a plane, rather than a series of independent solutions by considering separately the inversion of the different traces. Such processing is multi-channel. Depending on the parameterization method of the lithologic model, very different resolution methods are adopted.

The interval (O,X) which corresponds to the length of the seismic profile which it is desired to interpret, having been divided into a succession of disjointed intervals between checking points, the model may be parametered by the geometry of the layers and assuming that the impedance is a constant function in depth inside each layer and continues with a linear variation at x inside each of said intervals. Such a method is described for example in the U.S. Pat. No. 4,679,174.

This method of parameterization is interesting if it makes it possible to reduce the number of parameters to be processed, i.e. if the thickness of the different layers and the disjointed intervals are not chosen too small. However, in this case, the parameterization will not reflect reality, since the distribution of the acoustic impedance values inside a geological layer that is generally much more complex.

The method of the invention makes it possible to obtain an optimum model in at least two dimensions representing the variations of at least one physical parameter of a heterogeneous medium such as the sub-soil, responsible for the reflections undergone by waves transmitted into the sub-soil, the model agreeing as well as possible with recordings of signals received by a set of sensors disposed outside the medium in response to the waves reflected from the medium, with a value of said physical parameter chosen at at least one point, obtained following measurements or evaluations and with other information relating to the desired type of heterogeneity. It comprises the construction of a reference model in which the values of the physical parameter are adapted to the chosen values and to the information relating to the heterogeneities, the construction of synthetic recordings representing the response of the model to the waves transmitted from outside, and the construction of the optimum model which makes possible an adjustment of the synthetic recordings with respect to the recordings of received signals.

SUMMARY OF THE INVENTION

The method of the invention is characterized in that:

the construction of the optimum model is obtained by minimizing overall the differences between the values of signals read from the recordings of signals received and said synthetic recordings on the one hand, and the differences of said physical parameter with respect to the values taken by the same parameter at any point of the reference model, on the other hand, and in that it comprises:

the application to the differences of operators chosen for modelling the uncertainties respectively concerning the recorded signals and the reference model, as well as for imposing on the optimum model a correlation between the values of the parameter at the different points thereof.

The heterogeneous medium to be modelled may, for example, be a zone of the sub-soil, the set of sensors being disposed above the zone, and the value of the physical parameter measured at at least one point of the medium is obtained by signal reception means disposed in at least one well passing through this zone of the sub-soil.

In one embodiment, the signals recorded are seismic signals reflected by the different discontinuities of the sub-soil, the physical parameter is the acoustic impedance of the different ground layers, the value of the parameter is obtained by measurements in at least one well, and the reference model presents a stratigraphic model whose values agree with the acoustic impedance values obtained in each well.

In a preferred embodiment, the operators applied to the differences are covariance matrices whose terms are chosen as a function of an evaluation of the uncertainties concerning the reference model and the recordings of signals received.

BRIEF DESCRIPTION OF THE DRAWINGS

The method of the invention, its effects and advantages will be clear from the following description of one embodiment of the method applied to modelling the sub-soil, given by way of non-limitative example, with reference to the accompanying drawings in which.

DESCRIPTION OF THE PREFERRED EMBODIMENTS

Figure 1:
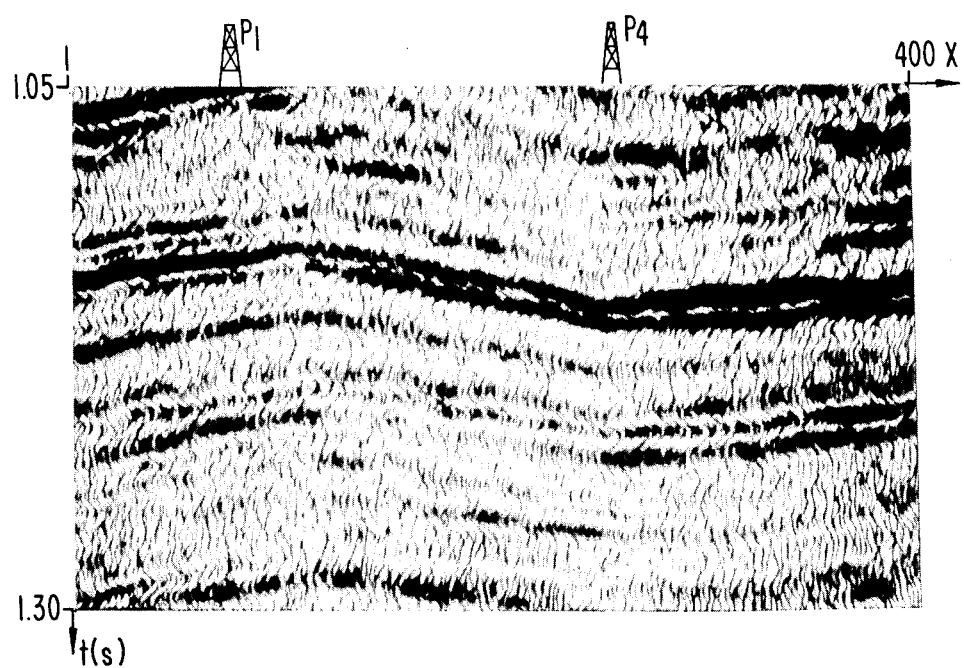
FIG. 1 is an example of a seismic section with 400 traces (between 1.05 s and 1.3 s) of a sub-soil zone obtained after conventional processing (deconvolution, stacking, etc . . . )

The method of the invention consists first of all in forming a two dimensional reference model $M_R(x,t)$ representing the variations of a physical characteristic of the medium from pinpoint data obtained by in situ measurements and stratigraphic information, where x represents the lateral coordinate and t represents the depth, measured in time, of the outgoing and return path of the waves from the surface. In the case of seismic prospecting, the model represents the distribution of the acoustic impedance of the sub-soil over a certain seismic profile length X explored and a maximum depth T (defined in time).

The model to be constructed must comply with the pinpoint measurements available in the zone explored. They are often obtained by density and velocity well logs which have been carried out in one or more wells. As a function of the propagation time of the waves between the transmission source and the seismic receivers, the distribution of the values of the acoustic impedance may be known for the ground through which each well passes. Possible corrections may have been introduced for making each impedance distribution agree with the seismic data and particularly for correctly positioning the depth (in time) of the important discontinuities.

We may then assert that the two dimensional model to be constructed $M_R$ corresponds at the vertical of each borehole to the following impedance values which have been measured therein. If I is the number of wells drilled with abscissa $x_i$ (i=1, . . . ,I) for which impedance value distributions $Z_{xi}$ (t) are available, having been obtained by measurements, with I>1, the model must comply with the condition:

$$M_R(x_i,t) = Z_{xi}(t) \qquad (1)$$

The construction of a reference model may be made by the conventional stratigraphic modelling technique which takes into account both the well-logging data (equation 1), information resulting from the structural interpretation of the seismic sections, and the stratigraphic interpretation.

It can be seen that the sub-soil formations have fewer irregularities along isochrones (horizons indicated by the signals) than in orthogonal directions. The isochrones are therefore lines of correlation of the explored medium.

The geometry of a correlation line may be obtained by aiming certain characteristic horizons on seismic sections having previously undergone conventional geophysical processing, of stratigraphic deconvolution. The structural interpretation makes it possible to divide the zone of the sub-soil being explored into several parts. In each part the interpreter may define the deposit modes from his geological knowledge: onlap, offlap or concordance. From this definition, the orientation of the correlation lines at any point of the medium may be known.

The stratigraphic modelling technique consists in defining linear variations of the impedance along correlation lines of equation $\tau$ (x) between the known values of $Z_{xi}(\tau(x_i))$ at the "intersections" with each well.

If data is available relative to only one well, extrapolation is carried out by considering the model to be constant along the correlation lines. In the case where data relative to, for example two wells is available, a linear interpolation therebetween may be carried out. The reference model of FIG. 3 has been constructed from well-logging data in a single well (P1) by considering that the parameters of the model were invariable along the correlation lines.

In the example studied, a modelling operator F(Z) may be defined for calculating the synthetic seismic section $S_{synt}(x,t)$. This section represents the seismic impedance response of the section Z(x,t), of the zone of the sub-soil explored, under the effect of the seismic excitations $W_x(t)$ assumed known, applied at the surface to the abscissa point x. The operator F(Z) has for expression:

$$F(Z) = S_{synt}(x,t) = \int R(x,\tau); W_x(t-\tau)d\tau \qquad (2)$$

with $$R(x,\tau) = d/d\tau \log Z(x,\tau) \qquad (3)$$

The seismic wavelets, $W_x(t)$ are defined previously by conventional stratigraphic deconvolution operations from well-logging measurements in well P1.

Figure 3:
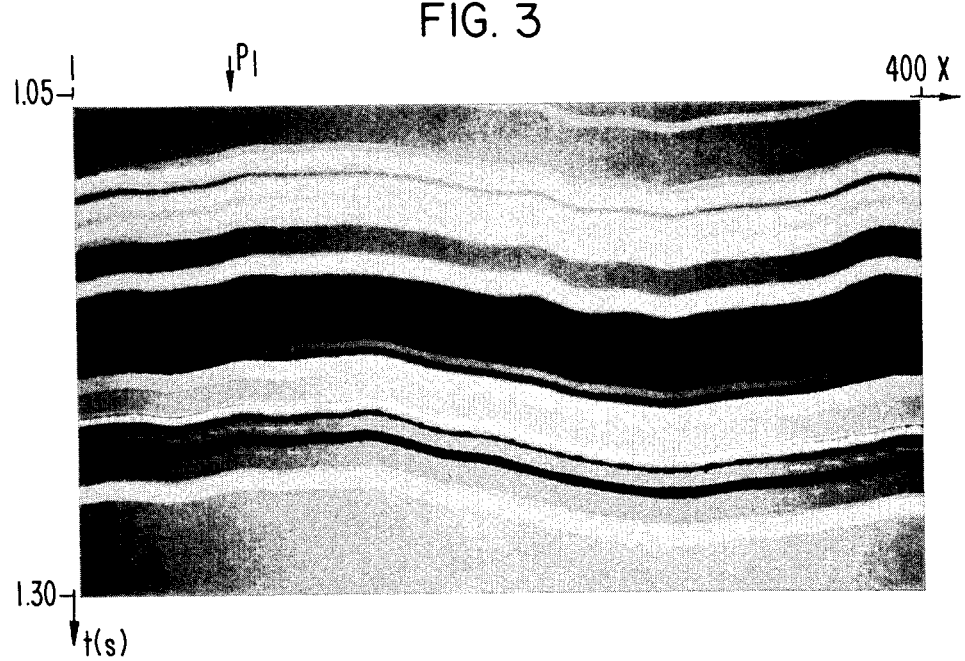
FIG. 3 is a reference model constructed by the stratigraphic modelling technique taking as data the impedance values obtained in a single well, the horizons indicated by the seismic signals being used for laterally guiding the extrapolation of this data.

In general, the reference model obtained is not satisfactory with respect to the seismic information, as is shown in FIG. 3. A synthetic seismic section $S_{synt}(x,t)$ has been produced from the stratigraphic model then compared with the seismic section to be interpreted Senr (x,t).

Figure 4:
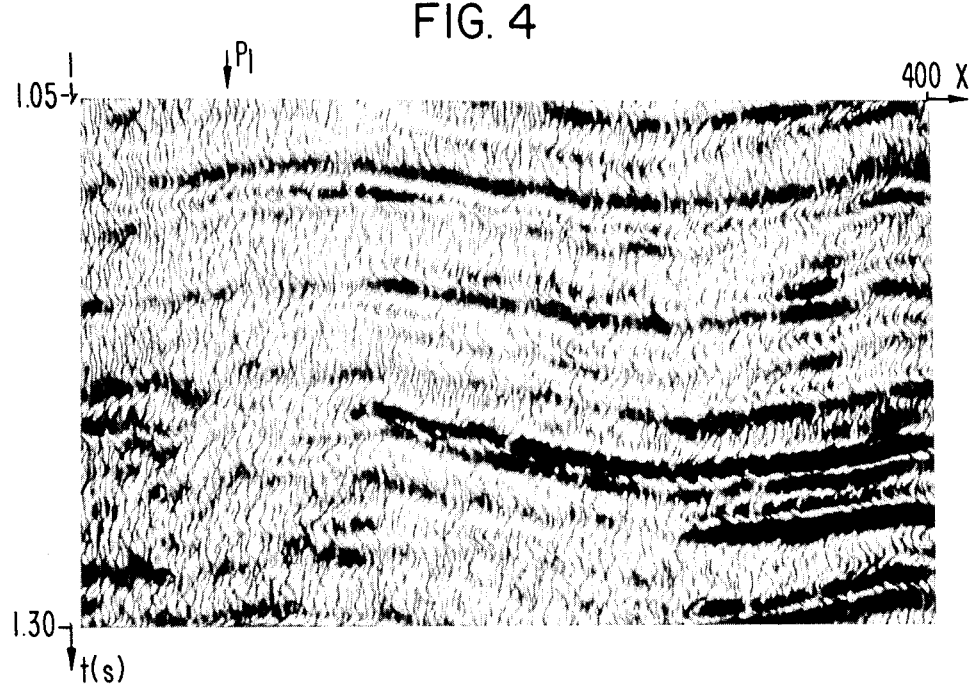
FIG. 4 shows a residual seismic section associated with the model of FIG. 3, obtained by subtracting from the seismic section of FIG. 1 a synthetic seismic section constituted by taking the same model as the basis.

The residual seismic section (FIG. 4) representing the differences between the two preceding sections shows that the stratigraphic model only represents an approximation of reality; all the more so the further away from the abscissa the well-logging data has been measured.

The method of the invention makes it possible to construct in a second step an optimum model representing, as well as possible, from the available data the distribution M(x,t) of a physical parameter, in this case the acoustic impedance.

Since the interpreter generally has great confidence in the in situ measurements, such as the well-logging data, used for constructing the reference model, the uncertainties thereof are related to errors concerning the geometry of the reference model, in the definition of the correlation lines for example, and in the presence of heterogeneities of the real medium along these lines. These errors are highly correlated in the direction of the correlation lines and are uncorrelated in the orthogonal directions.

The errors are modelled on the reference model by a random Gaussian variable whose covariance operator Cm is chosen with exponential variation along the correlation lines and is diagonal in the orthogonal directions:

$$C_m(x,x',t,t') = V^2 \exp\left[\frac{-(x-x')}{l}\right] \cdot \delta(t-t') \qquad (4)$$

where $V^2$ represents the variance, l the correlation length and J is a Dirac measurement. Other covariance operators may be chosen, so long as they represent a lateral correlation. Moreover, the covariance is conditioned by the availability of well measurements.

The variance $V^2(x,t)$ and the correlation length l (x,t) may vary laterally and with time. These two parameters are therefore defined over the whole of the field corresponding to the reference model. Thus, the correlation length must be zero or almost zero in the vicinity of a discordance. If not, a smoothing effect of the optimum model occurs at the corresponding position.

The interpreter having chosen throughout suitable values for $V^2(x,t)$ and l (x,t), the inverse of the covariance operator (a matrix) is then determined which is to be associated with a reference model $M_R(x,t)$.

The indirect measurements of the physical parameters of the explored zone, such as those obtained by seismic prospection operations, are generally affected by errors. These errors are represented by a random Gaussian variable of zero average which may be correlated with time for example, the amplitude spectrum of the seismic noise being the same as that of the signal, but not correlated laterally (along x). The result is that the covariance operator $C_S$ (also a matrix) describing the uncertainties of the indirect measurements which are available (seismic data for example) is then diagonal relatively to the variable x. It is completely defined by the variance Vs(x,t) chosen at each point of the explored field. The interpreter has the entire responsibility of the choice of the variances which describe the uncertainties concerning the indirect measurements which he has available.

The most likely impedance distribution Mopt(x,t) is then determined. It is this which, inside limits fixed at x and t, minimizes the following function:

$$J(Z) = J_M(Z) + J_S(Z) \quad (5)$$

where $$J_M(Z) = [M(x,t) - M_R(x,t)]^T \cdot Cm^{-1} \cdot [M(x,t) - M_R(x,t)] \quad (6)$$

$$J_S(Z) = [S_{Synt}(x,t) - S_{enr}(x,t)]^T \cdot Cs^{-1} \cdot [S_{Synt}(x,t) - S_{enr}(x,t)] \quad (7)$$

where the matrices $Cm^{-1}$ and $Cs^{-1}$ represent respectively the inverses of the chosen matrices Cm and Cs, and where the terms in the form $[\ ]^T$ represent the matrix transpositions.

In the case of continuous variations, the component $J_M$ is expressed in the following way:

$$J_M(x,t) = \int_o^X \int_o^T \left[ \frac{1}{2lV^2} (M - M_R)^2 + \frac{1}{2V^2} [\text{grad}(M - M_R) \cdot u]^2 \right] dx\, dt \quad (8)$$

where $u$ is the unit vector along the correlation line.

Figure 9:
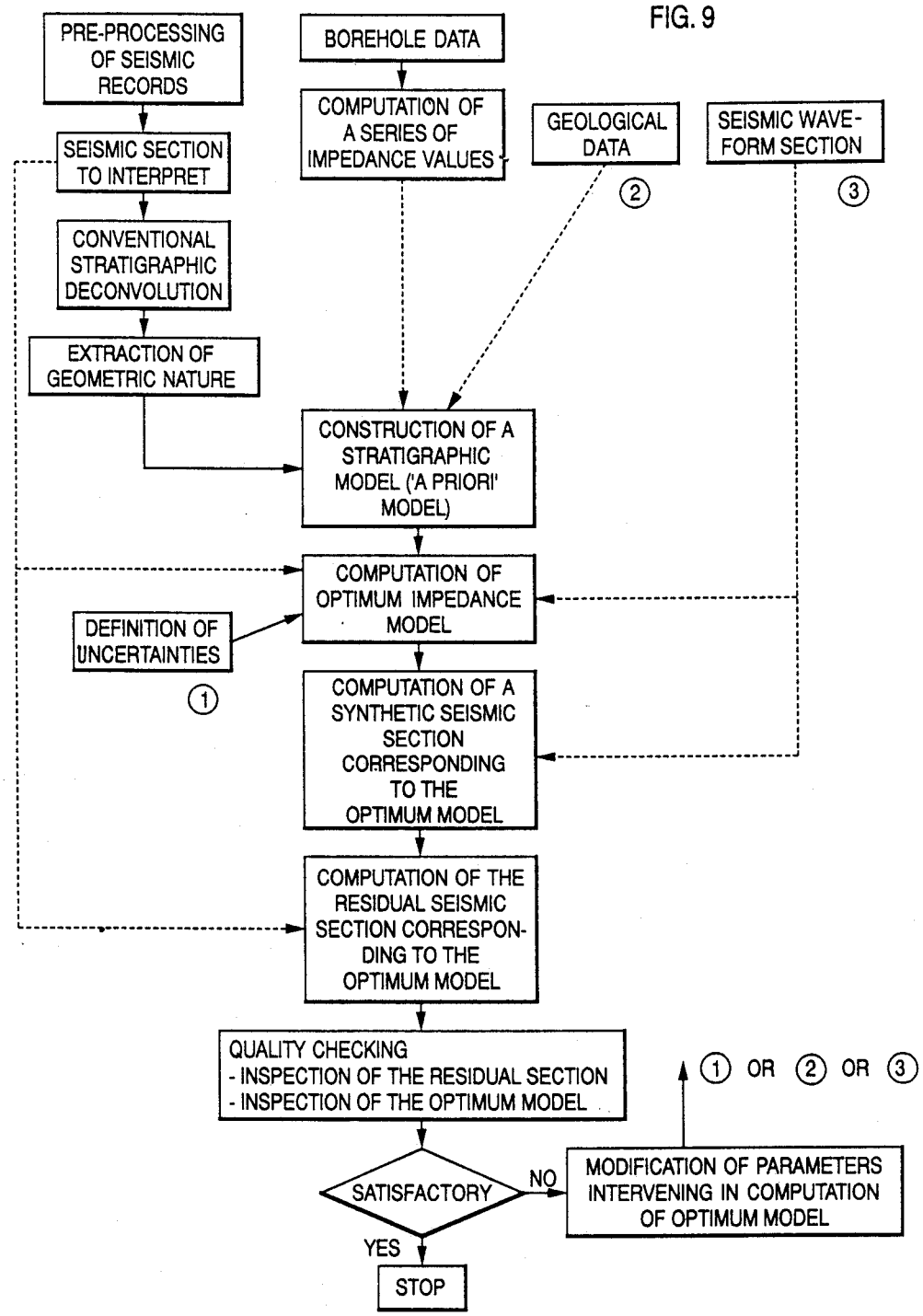
FIG. 9 is an example of a flowchart for constructing the desired optimum model.

The determination of the desired model Mopt(x,t) which minimizes the functional J may be obtained by different known optimization methods (gradient or conjugate gradient method, quasi-Newton method, etc.) in agreement with the flowchart of FIG. 9, by data processing means. The interpreter having defined the reference model and the values of the different parameters V and l modelling the errors, the construction of the optimum model is carried out automatically.

Figure 7:
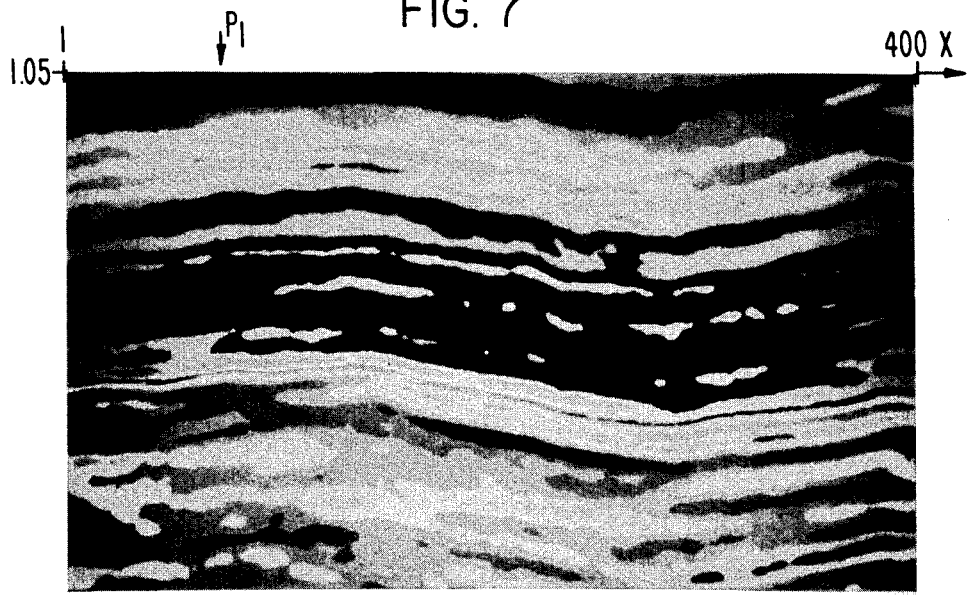
FIG. 7 is an optimum impedance model obtained by the method of the invention using a realistic choice of covariance operators.

A model $M_{opt}(x,t)$, constructed by applying the method of the invention and using the stratigraphic reference model of FIG. 3, is shown in FIG. 7. Its validity was checked by calculating the synthetic seismograms which are associated therewith. The residual seismic section (FIG. 8), representing the difference between these synthetic seismograms and the seismograms derived from recordings in the field, only shows "events" which are not correlated laterally. There remains essentially only noise.

The overall function to be minimized J(Z) is the sum of a seismic difference function $J_s(Z)$ and another properly geological difference function $J_m(Z)$. The effect of the first is to correct the geometry of the reference model and to introduce lateral variations which explain the seismic section derived from the recorded data. With the geological functional $J_m(Z)$ the optimum model is made to satisfy the geological knowledge of the interpreter. By an appropriate choice thereof, he may make the solution of the inverse problem stable, which is fundamentally underdetermined, as is well known by specialists. In particular, it makes it possible to introduce into the solution low frequencies present in the well-logging data but not in the seismic data. In the geological term, an appropriate choice of the variances and of the correlation lengths results in structuring laterally very efficiently the model obtained by use of the method of the invention. This prevents the synthetic seismic section derived from the model from adjusting itself to the incoherent noise present in the seismic section derived from the recorded data. The result is good noise elimination and so improvement of the vertical resolution of the sub-soil explored.

It should also be emphasized that the geological difference function introduces coupling between the adjacent traces of the impedance model. Inversion of the seismic section takes place, therefore, as a whole and not trace by trace, as happens usually (cf. Oldenburg et al. mentioned above).

Figure 5:
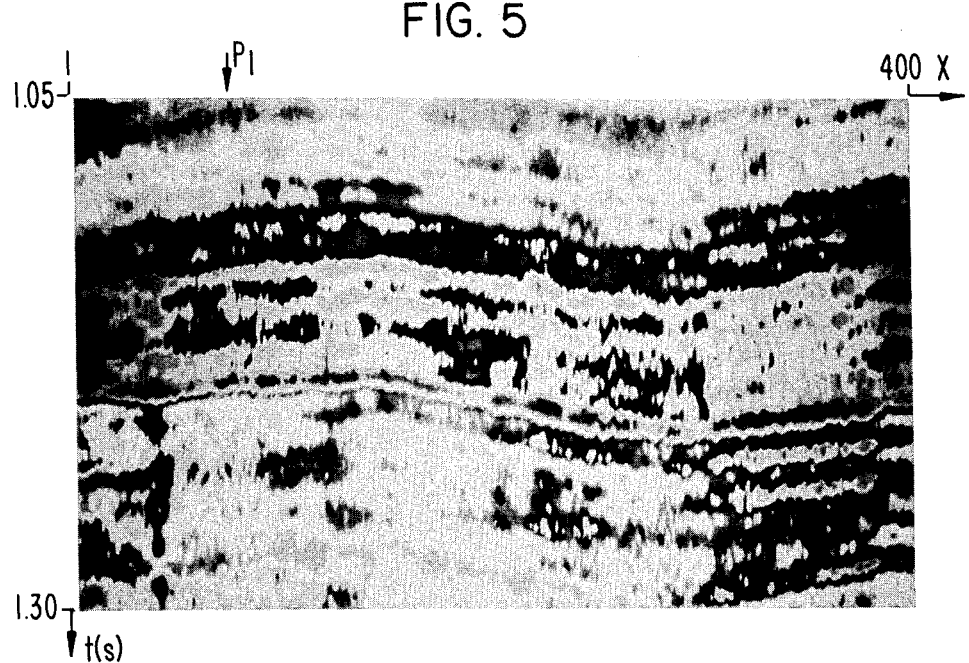
FIG. 5 is an example of an impedance model which may be obtained using the method of the invention if the interpreter has little confidence in the reference model.
Figure 6:
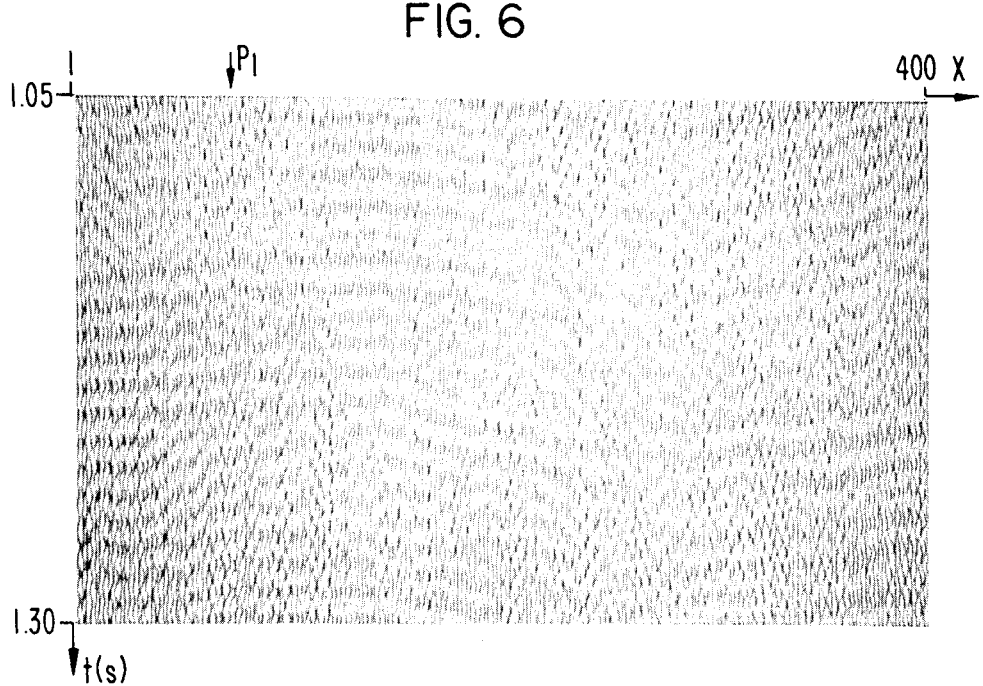
FIG. 6 is a residual seismic section corresponding to the model of FIG. 5.

The relations (4) and (5) show that if the interpreter has little confidence in the seismic data, by choosing high values for the seismic variance $V_S^2$, the seismic function $J_S(Z)$ plays in the function $J(Z)$ a small role with respect to that of the geological function $J_M(Z)$. The resultant model approximates then the stratigraphic model taken as reference model. If the interpreter, on the other hand, has little confidence in the stratigraphic model, by choosing a large variance $V^2$ and a small correlation length l, the resultant model will be close to a model obtained by conventional stratigraphic deconvolution (mono channel processing). This is the case of the model shown in FIG. 5, where the differences have been essentially minimized with respect to the seismic data. It can be seen that the noise present on the seismic section is transferred into the model obtained, as shown by the residual seismic section of FIG. 6.

It can be seen that the optimum model is intermediate between a model obtained by stratigraphic modelling and another resulting from mono channel type processing (stratigraphic deconvolution and pseudo logs) of the seismic data alone.

Figure 2:
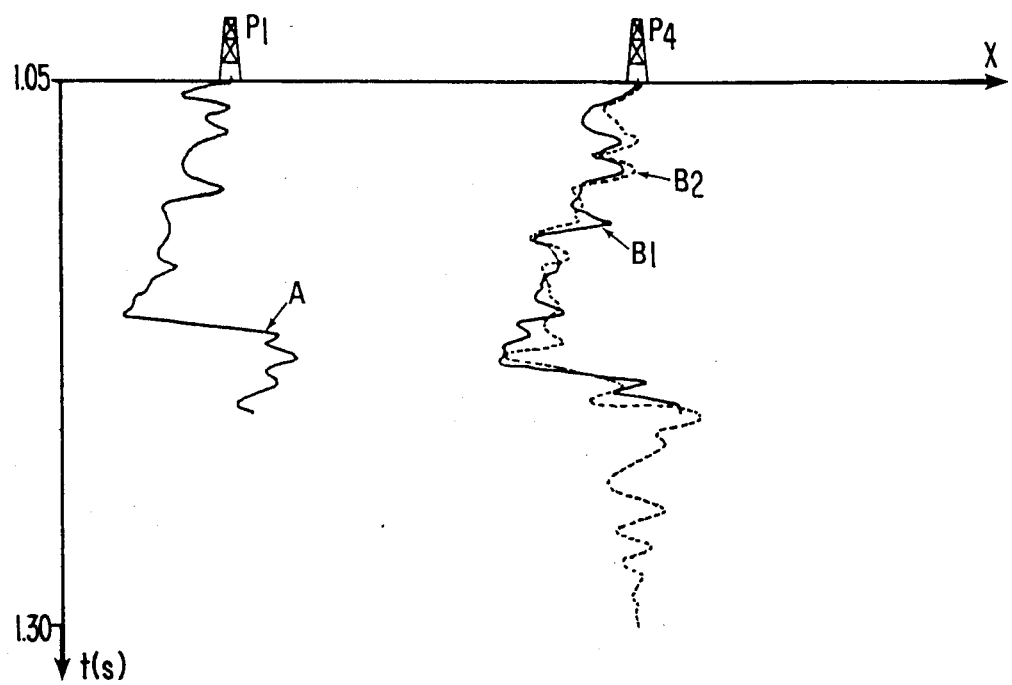
FIG. 2 presents examples of acoustic impedance logs obtained from well-logging carried out in wells passing through the sub-soil zone and a pseudo log obtained from the abscissa of one of the wells using the method of the invention.
Figure 8:
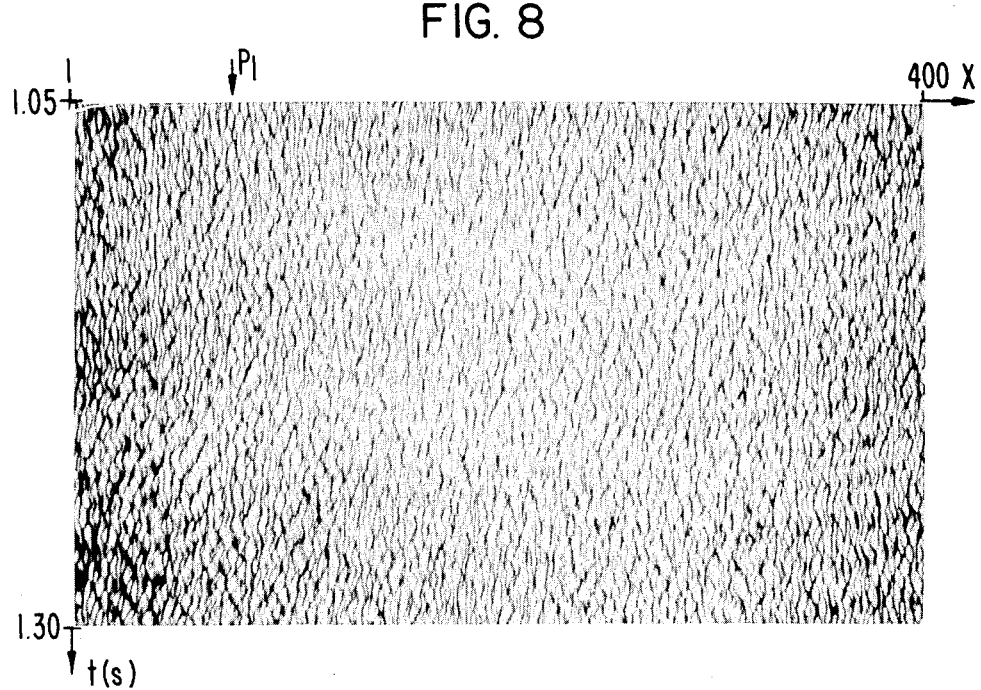
FIG. 8 is a residual seismic section corresponding to the optimum model of FIG. 7.

The structural coherence of the optimum model (FIG. 7) is better than that obtained using the seismic data alone, and the laterally incoherent noise (along x) has not been interpreted as shown in FIG. 8. It has been obtained by extrapolation from measurements carried out in a single well (P1), and it can be seen in FIG. 2 that the impedance values which is gives to the abscissa of the well P4 (curve B2) correspond in fact to those which were effectively measured (curve B1). The method makes it possible to predict logs from seismic data.

The covariance operators Cm and Cs make it possible to describe the uncertainties in the seismic measurements and in the reference model. By applying the method of the invention, a compromise may be found between the adjustment to the reference model and the adjustment to the seismic data. If the seismic data is privileged, the solution tends towards the result of conventional stratigraphic deconvolution, whereas if there is only a limited confidence in the seismic data, the solution tends towards the reference model. Thus, by varying the uncertainties, and therefore the degree of knowledge about the data and the reference model, the application of the method leads automatically to a large variety of different models, and the whole of the likely solutions may be explored.

The embodiment which has been described comprises the use of impedance values resulting from in situ measurements. If such measurements are not available but only simple estimations or evaluations are available, the method of the invention may nevertheless be put into practice from the parameter values which are available.

The embodiment which has been described comprises the use of the vertical outgoing and incoming travel time of the waves emitted to measure the depth of the zone studied. This is in no way indispensable. If data or estimations are available concerning the propagation velocity C(x,t) of the waves in the medium as a function of the depth, obtained by any process whatsoever, by changing the variables the coordinate t may be replaced by the coordinate z measuring the depth in meters, these two coordinates being related by a relationship of the type:

$$Z(x,t) = \tfrac{1}{2} \int_0^t C(x,\theta)d\theta$$

The method of the invention has been described in an application to modelling the acoustic impedance of the sub-soil. It is obvious that it can be applied to any other physical parameter, such, for example, as the speed of propagation of the waves or the density influencing the seismic data obtained and that the model obtained, may be represented not only in the system of coordinates $(x,\tau)$ but also in the system $(x,z)$.

What is claimed is:

1. A method of obtaining an optimum model having at least two dimensions representing the variations of a physical parameter of a subterranean zone causing reflections by seismic waves transmitted into the earth, the model including a vertical dimension and a transverse dimension and closely agreeing with recordings of seismic data obtained by a set of sensors, disposed outside the subterranean zone and along the transverse direction, in response to seismic waves reflected from the zone due to the transmitted seismic waves, with values of the physical parameter chosen at different points of various depths in the zone as a result of measurements or evaluations, and with stratigraphic information, actual values of the physical parameter in the reference model, and the recorded seismic data having uncertainties therein, said method comprising the steps of:

(a) constructing a reference model having values of the physical parameter adapted to the chosen values, and forming synthetic recordings representing the response of the reference model to the transmitted seismic waves;

(b) optimizing the reference model by an iterative process including forming intermediate synthetic recordings to reach the optimum model, the optimizing including minimizing for the entire subterranean zone the differences between the values of the recorded seismic data and the intermediate synthetic recordings, while simultaneously minimizing the differences between the chosen values of the physical parameter and the values of the same physical parameter at any point of the reference model, the minimizing including applying to the differences operators selected for closely modelling variations in uncertainties, respectively, in the recorded seismic data and in the reference model, as well as for imposing on the optimum model a correlation between the values of the physical parameter at different points along directions different from the vertical.

2. The method as claimed in claim 1, further comprising:

selecting lines of correlation in the subterranean zone along directions different from the vertical; and wherein:

the operator for closely modelling variations in uncertainties in the recorded seismic data is a diagonal matrix covariance operator associated with a random Gaussian variable with a zero average with no correlation in the transverse direction; and the operator for closely modelling variations in uncertainties in the reference model is a matrix covariance operator associated with a random Gaussian variable chosen with an exponential variation along the correlation lines.

3. The method as claimed in claim 1 or 2, wherein the minimizing further includes minimizing the sum of a first function $J_M$ related to the reference model and a second function $J_S$ related to the recorded seismic data, such that:

$$[J_M = (M-M_R)^T \, Cm^{-1}(M-M_R)$$

and $$J_S = (S_{synt} - S_{enr})^T Cs^{-1}(S_{synt} - S_{enr})]$$

$$J_M = (M-M_R)^T. \, Cm^{-1}.(M-M_R)$$

and $$J_S = (S_{synt} - S_{enr})^T. Cs^{-1}.(S_{synt} - S_{enr}),$$

where $(M-M_R)$ is a vector whose terms measure the estimated differences of model M with respect to the reference model $M_R$, $(M-M_R)^T$ is the same vector transposed, $Cm^{-1}$ is the inverse of the covariance matrix representing the uncertainties in the reference model, $(S_{synt} - S_{enr})$ is a vector whose terms measure the differences measured between the signals read out respectively from the recorded seismic data and the intermediate synthetic recordings, $(S_{synt} - S_{enr})^T$ is the same vector transposed, and $Cs^{-1}$ is the inverse of a covariance matrix representing the uncertainties in the recordings of the signals obtained outside the medium.

4. The method as claimed in claim 1 or 2, wherein the reference model is a stratigraphic model.

5. The method as claimed in claim 3, wherein the reference model is a stratigraphic model.

6. The method as claimed in claim 5 further comprising measuring the values of the physical parameter along a borehole through the subterranean zone with a logging tool.

7. The method as claimed in claim 3 further comprising measuring the values of the physical parameter along a borehole through the subterranean zone with a logging tool.

8. The method as claimed in claim 1 or 2, further comprising measuring the values of the physical parameter along a borehole through the subterranean zone with a logging tool.

* * * * *